United States Patent [19]

Hudson

[11] 4,080,092

[45] Mar. 21, 1978

[54] PORTABLE DRILL GUIDE APPARATUS

[76] Inventor: Russell O. Hudson, 1126 Castleman Dr., Longview, Wash. 98632

[21] Appl. No.: 692,850

[22] Filed: Jun. 4, 1976

[51] Int. Cl.[2] .......... B23B 45/14

[52] U.S. Cl. .......... 408/110

[58] Field of Search .......... 408/110–112, 408/115, 87, 99, 712

[56] References Cited

U.S. PATENT DOCUMENTS

| | | | |
|---|---|---|---|
| 2,670,638 | 3/1954 | Roy | 408/112 |
| 2,909,085 | 10/1959 | Jepson | 408/112 |
| 3,077,129 | 2/1963 | Carles | 408/112 |
| 3,864,053 | 2/1975 | Harwood | 408/110 |

FOREIGN PATENT DOCUMENTS

| | | | |
|---|---|---|---|
| 739,498 | 11/1955 | United Kingdom | 408/110 |

*Primary Examiner*—Leonidas Vlachos
*Attorney, Agent, or Firm*—Eugene D. Farley

[57] ABSTRACT

Drill guide apparatus designed for use with a portable electric, air, or hydraulic drill includes a base adapted to rest on a support. The base is provided with a handle for portability. A standard is mounted on the base through a pivotable mounting connection. A slide and guide mounting means mounts the drill on the standard. Stop means on the standard determine the depth of the drilled hole.

1 Claim, 8 Drawing Figures

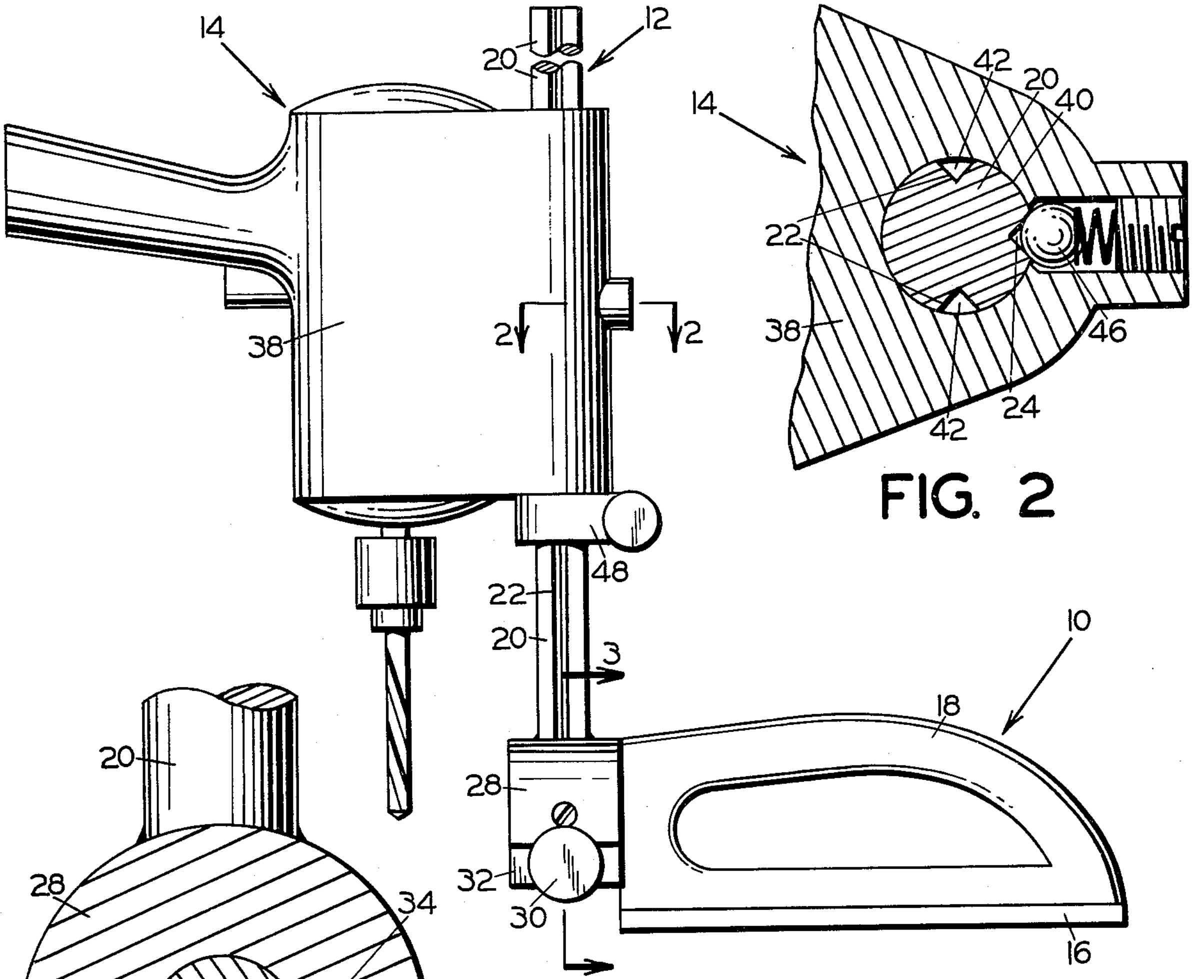
FIG. 2
FIG. 1
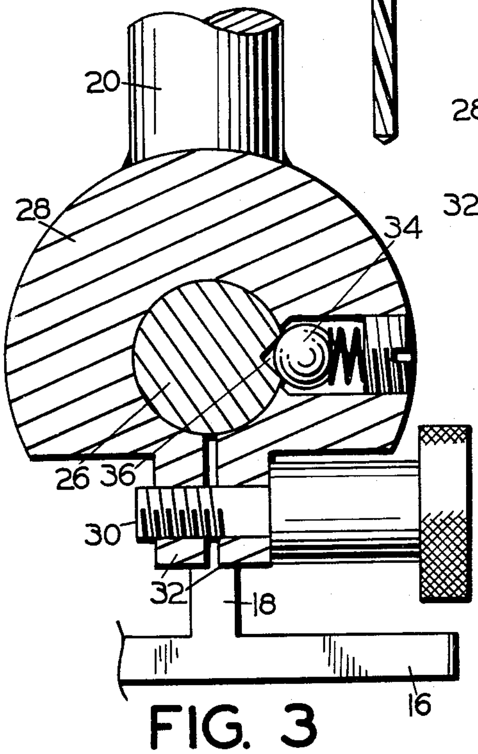
FIG. 3
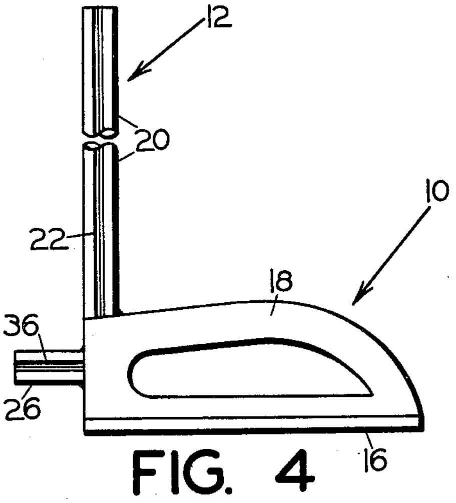
FIG. 4
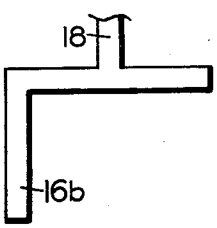
FIG. 5
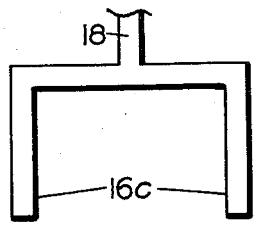
FIG. 6
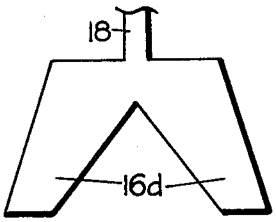
FIG. 7
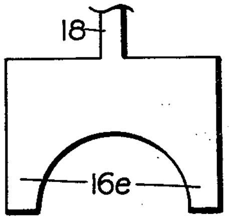
FIG. 8

PORTABLE DRILL GUIDE APPARATUS

BACKGROUND AND SUMMARY OF THE INVENTION

This invention relates broadly to portable drilling apparatus. It pertains particularly to a guide for mounting a portable drill and guiding its drilling movement in an accurately determined path.

Various guiding systems for portable electric, air and hydraulic drills heretofore have been devised. These in effect convert such drills to portable drill presses. See for example the following U.S. Pat. Nos.: 2,261,746; 2,748,628; 2,622,458; 3,089,357; 2,637,225; 3,250,153.

It is the object of the present invention to provide a drill guide of the class to which these patents are directed, but characterized by the following advantages in that:

1) It supports a portable drill securely and guides it accurately.
2) It causes the drill to drill a straight hole.
3) It is adjustable to various angles.
4) It is adaptable for use on work pieces of various contour, as pipes, channels, and flat work pieces of wood, metal, plastic or other structural materials.
5) It is applicable in any position on the work i.e. at any position inwardly from the edge thereof.
6) It is easily adaptable to application with portable drills of various makes and contour.
7) It may be controlled to drill accurately to a predetermined depth.
8) It is characterized by a simple, effective, gravitational feed.
9) It is useful in drilling a wide range of hole sizes in all desired drill positions.
10) It minimizes the breakage of drill bits.
11) It is simple in construction and positive and easy to operate.

In brief summary, the drill guide of my invention which accomplishes the foregoing and other objects of the invention is adapted for use with a drill having an apertured case or case extension. The guide includes a substantially horizontal base adapted to rest on a selected support. Handle means is integral with the base so that it may be moved from place to place and held during drilling. A standard having a cross section dimensioned for reception in the aperture of the apertured case mounts the drill in relative sliding engagement.

Connecting means, preferably, pivotally adjustable connecting means, connects the standard to the base. Stop means on the standard below the drill arrest the motion of the latter at a predetermined drilling endpoint. Tensioning means interengaging the drill and standard control the sliding motion of the drill, and hence the rate of drilling.

DESCRIPTION OF PREFERRED EMBODIMENTS OF THE INVENTION

The hereindescribed portable grill guide is described herein with particular reference to the drawings wherein:

FIG. 1 is a view in side elevation of the drill guide.

FIG. 2 is a fragmentary, transverse sectional view taken along line 2—2 of FIG. 1.

FIG. 3 is a sectional view taken along line 3—3 of FIG. 1.

FIG. 4 is a view in elevation of a guide standard subassembly employed in the drill guide of FIGS. 1 to 3, and FIGS. 5, 6, 7 and 8 are fragmentary views in end elevation illustrating alternate types of bases which may be employed in the drill guide of FIGS. 1–3.

As is apparent from a consideration of FIG. 1, the hereindescribed drill guide assembly comprises a base subassembly indicated generally at 10, and a guide standard subassembly indicated generally at 12, which mounts a drill subassembly indicated generally at 14.

The base subassembly 10 comprises a substantially horizontal base 16 adapted to rest on a support surface. Integral with the base 16 is a handle 18. This preferably is a flatiron type handle which may be grasped readily for transporting the guide from place to place and for holding it stationary during the drilling operation.

Base 16 is adapted to rest flat on a support surface which may comprise either the work piece or an external support, such as a work table.

Base 16 may assume various configurations depending upon the character of the work to be drilled. Such configurations are shown in FIGS. 5, 6, 7 and 8.

Thus, the base may be configured for application to a flat work piece, a predetermined distance inwardly from the edge thereof. In this event it assumes the angled configuration of base 16*b* of FIG. 5. If the work piece is a channel, or rectangular member, the base may assume the configuration 16*c* of FIG. 6.

If on the other hand the work piece is round, as a length of pipe or a dowel, a base 16*d*, FIG. 7, of web-shaped configuration may be used. This makes the base universally applicable to a wide range of sizes of round work pieces.

Where the work piece is arcuate or circular, of a fixed size, the base may assume the configuration 16*e* of FIG. 8.

Guide standard 12 supported on base 10 comprises a bar 20 of stout structural material and preferably of round cross section. The length of the bar is sufficient to permit the desired travel of the drill as required both to position the drill and to drill an opening of the desired depth.

As seen particularly in FIG. 2, the standard 20 is provided with at least one, preferably a plurality of longitudinally extending grooves 22. In the illustrated form of the invention there are three such grooves. Grooves 22 are positioned diametrically opposite each other on opposite sides of standard 20. They serve to guide the motion of the drill. Groove 24, intermediate between grooves 22, serves a tensioning purpose as will appear hereinafter.

Connecting means are provided for connecting standard subassembly 12 to base subassembly 10.

Although various types of connections may be employed for this purpose, it is preferred to use an adjustable frictional bearing assembly which permits guide 20 to be adjusted to various angles. This permits drilling holes at corresponding angles.

Thus, as shown particularly in FIGS. 1 and 3, base 10 has extending outwardly therefrom in an axial direction a shaft 26. The shaft is journaled in a split bearing 28 which engages the shaft frictionally. The bearing is adjusted between positions of frictional engagement and disengagement by means of a screw 30 working in aligned threaded openings through tabs 32 integral with the bearing and serving as levers. A spring pressed, screw-adjusted, ball-type detent 34 working in a groove 36 in shaft 26 tensions the bearing relative to the shaft and assists in making a fine adjustment of the relative position of one to the other.

Drill assembly 14 includes a drill which as noted above may comprise a portable electric, air, or pneumatic drill of conventional construction and varying contour and dimensions. Preferably the drill is provided with a case 38 which is apertured at 40, FIG. 2, to receive standard 20 in relative sliding engagement. However, if the case is not so apertured, any conventional drill may be modified for the purposes of invention by attachment of an apertured plate or plates which serve the same purpose as an apertured case. As used herein, the term "apertured case" is to be read as including not only an apertured case per se, but a case mounting apertured plates or other structural members.

The aperture 40 of case 38 has inwardly extending projections 42. These are diametrically opposed to each other and enter grooves 22 of the standard, cooperating with the grooves in guiding the drill assembly as it moves up and down the standard.

A screw-adjusted, spring-pressed, ball detent 46 is mounted in a suitable location on the drill case in such a manner that the ball works in groove 24 of the standard, tensioning the drill relative to the standard so that the desired degree of frictional interengagement between these two members of the assembly is obtained.

Means also are provided for limiting the travel of the drill, thereby determining the depth of the hole to be drilled.

As shown in FIG. 1, a drill stop comprising a screw-adjusted sleeve 48 mounted on standard 20 below the drill is employed for this purpose.

OPERATION

The operation of the hereindescribed drill guide is as follows:

Base 10 is located accurately either on the work or on a support adjacent the work. Standard 20 is adjusted to the desired angular position by rotation about shaft 26, and thereafter locked in position by means of screw 30.

Portable drill 14 is mounted on the upper end of standard 20 by slipping its apertured case over the standard. If not done previously, the degree of frictional engagement between drill case and standard is adjusted by adjustment of spring pressed ball detent 46.

Drill stop 48 is located in the desired position of adjustment on standard 22. The drill then is started in the usual manner and permitted to gravitate downwardly against and through the work until it contacts stop 48. By operation of the guide, the motion of the drill is controlled at an optimum rate and in a precise direction, determining the satisfaction of the various above-stated objects of the invention.

Having thus described my invention in preferred embodiments, I claim as new:

1. A portable drill guide, comprising:

a) an elongated base member having a support-resting bottom surface adapted to engage and rest upon a support, and a flatiron type handle disposed above and extending substantially the full length of the support-resting surface of the base member, the flatiron type handle having an elongated finger-receiving opening extending substantially parallel to the support-resting surface of the base member, b) an elongated guide standard, c) a split bearing on one end of the guide standard, d) a shaft extending forwardly from the base member substantially parallel to the support-resting surface thereof and mounting the split bearing rotatably thereon with the guide standard extending upwardly therefrom, e) a clamp screw bridging the split in said bearing for releasably clamping the latter to the shaft in a predetermined position of rotation of the bearing relative to the shaft and hence a predetermined angular inclination of the guide standard relative to the base member, f) a portable drill mount slidably engaging the guide standard for unobstructed movement along the length thereof, g) interengaging guide means on the drill mount and standard for guiding the movement of the drill mount along the length of the standard and preventing rotation of the drill mount relative to the standard, h) friction producing means interengaging the drill mount and standard for providing a predetermined frictional resistance to movement of the drill mount along the standard, and i) drill stop means mounted on the standard for adjustment longitudinally thereof for limiting movement of the drill mount relative to the base member.

* * * * *